(12) United States Patent
Mellmer

(10) Patent No.: US 6,446,253 B1
(45) Date of Patent: Sep. 3, 2002

(54) MECHANISM FOR ACHIEVING TRANSPARENT NETWORK COMPUTING

(75) Inventor: Joseph Andrew Mellmer, Salt Lake City, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/272,522

(22) Filed: Mar. 19, 1999

Related U.S. Application Data

(60) Provisional application No. 60/078,827, filed on Mar. 20, 1998.

(51) Int. Cl.[7] .................................................. G06F 9/44
(52) U.S. Cl. ........................ 717/100; 717/104; 717/108
(58) Field of Search ................................ 709/200, 217, 709/230, 300, 304; 717/1, 100, 108, 116, 165, 104, 102, 103; 707/203, 10, 200, 230, 250

(56) References Cited

U.S. PATENT DOCUMENTS

| | | | | | |
|---|---|---|---|---|---|
| 5,581,705 | A | * | 12/1996 | Passint et al. ............... | 709/200 |
| 5,692,183 | A | * | 11/1997 | Hapner et al. ............... | 707/103 |
| 5,897,635 | A | * | 4/1999 | Torres et al. ................. | 707/10 |
| 5,946,670 | A | * | 8/1999 | Motohashi et al. ......... | 705/400 |
| 5,966,531 | A | * | 10/1999 | Skeen et al. ................ | 709/315 |
| 6,006,018 | A | * | 12/1999 | Burnett et al. .............. | 709/219 |
| 6,026,448 | A | * | 2/2000 | Goldrian ...................... | 709/712 |
| 6,044,205 | A | * | 3/2000 | Reed et al. .................. | 709/201 |
| 6,052,525 | A | * | 4/2000 | Carlson et al. .............. | 717/100 |
| 6,253,207 | B1 | * | 6/2000 | Malek et al. ................ | 707/104 |
| 6,101,508 | A | * | 8/2000 | Wolff ........................... | 707/218 |
| 6,131,185 | A | * | 10/2000 | Coskun et al. .............. | 717/129 |
| 6,141,737 | A | * | 10/2000 | Krantz et al. ............... | 711/171 |
| 6,173,439 | B1 | * | 1/2001 | Carlson et al. .............. | 717/108 |
| 6,212,566 | B1 | * | 4/2001 | Vanhoof et al. ............. | 709/230 |
| 6,233,582 | B1 | * | 5/2001 | Traversat et al. ............ | 707/102 |
| 6,237,143 | B1 | * | 5/2001 | Fontana et al. .............. | 717/127 |
| 6,272,673 | B1 | * | 8/2001 | Dale et al. ................... | 717/100 |
| 6,327,698 | B1 | * | 12/2001 | Kolluru ........................ | 717/100 |

OTHER PUBLICATIONS

Dineen et al, "The newteok computing architecture and system an environment for developing distributed applications", IEEE, pp. 296–299, May 1988.*

Voss et al, "A framework for remote dynamic program optimization", ACM Dynamo, pp. 32–40, Jan. 2000.*

Mathew et al, "Development routes for message passing parallelism in Java", ACM Java, pp. 54–61, Mar. 2000.*

Nelisse et al, "Object based collective communication in Java", ACM JAVA, pp. 11–20, Jun. 2001.*

Carpenter et al, "Object serialization for marshalling data in Java interface to MPI", ACM JAVA, pp. 66–71, May 1999.*

* cited by examiner

*Primary Examiner*—Anil Khatri
(74) *Attorney, Agent, or Firm*—Dinsmore & Shohl LLP

(57) ABSTRACT

A program framework for use in a networked system includes an abstract, protocol-independent storage system in which data sources are stored. The storage system is abstract because it includes data stored anywhere in the networked system, yet references to the data appear to the user as references to a local storage system. Associated with each data source is one or more views, where a view is a user defined logical interface for accessing the data source. The view is mapped to an implementation which identifies either or both of a communication protocol for accessing the data source and one or more tasks to be performed on the data source. As such, the logical interface to the data source is separated from the methods for implementing accessing or operating the resource. A programmer accesses data using one of the available views of the data. The functionality of the system may be easily expanded by adding different views to the data sources. In addition, because any program may access a data source using any of the available views, information can be seamlessly transferred between programs, thereby significantly reducing inter-program communication difficulties.

20 Claims, 9 Drawing Sheets

MECHANISM FOR ACHIEVING TRANSPARENT NETWORK COMPUTING

RELATED APPLICATIONS

This application claims the benefit of U.S. Provisional Application Ser. No. 60/078,827, filed Mar. 20, 1998.

FIELD OF THE INVENTION

This invention relates generally to the field of computer systems and more specifically to a program architecture.

BACKGROUND OF THE INVENTION

With the advent of networked computing, it has become possible for various types of computing systems in different locations to share information and programming tools. Programs that are executing on one system may be able to access data or programs that are located on local or remote systems. For example, the introduction of the Internet has allowed web-capable devices to access data from systems located anywhere in the world.

One common problem associated with allowing programs to share information is managing the interfaces within and between the programs. Any given program can be said to include three components: a user interface, program functionality and data source. Each new program defines its own protocols and includes various routines for enabling the exchange of information between these three components. Thus, any program may be viewed as a set of separate routines. The quality of each of the routines and the interface between these routines is often inconsistent. Because there is typically no uniform interface between these routines, it is often difficult to extend the functionality of the program or tailor the operation of the program to a specific need. Thus, this non-uniform approach to routine development adversely effects the flexibility of the program at an intra-program level.

In addition, the lack of uniformity in program design adversely effects the flexibility of inter-program communication. At any given time during operation, a system may be accessing any number of local and remote programs. Frequently, it is desirable to transfer data between such programs. However, because each program may have different interface protocols, it is often a complex process to share data between programs. Often, in order to effectively share data between programs, the system user has to be educated as to the protocols of each of the independent programs, making it difficult for an uneducated user to optimally use the system programs.

Another problem with the current program design technique is the inherent waste of storage and programming resources. Each program is generally packaged as a unit, with all of the necessary routines provided within the package. When many programs are loaded on the system, each of the many programs may include substantially identical routines. The presence of multiple, identical routines within the system increases the storage requirements for the system. In addition, the time required for program developers to develop identical routines is a waste of programming resources.

It would be desirable to develop a program design framework that facilitates program modification and inter-program communication as well as reduce the unnecessary utilization of programming resources.

SUMMARY OF THE INVENTION

A program framework for use in a networked system includes an abstract, protocol-independent storage system in which data sources are stored. The storage system is abstract because it includes data stored anywhere in the networked system, yet references to the data appear to the user as references to a local storage system. Associated with each data source is one or more views, where a view is a user defined logical interface for accessing the data source. The view is mapped to an implementation which identifies either or both of a communication protocol for accessing the data source and one or more tasks to be performed on the data source. As such, the logical interface to the data source is separated from the methods for implementing accessing or operating the resource. A programmer accesses data using one of the available views of the data. The functionality of the system may be easily expanded by adding different views to the data sources. In addition, because any program may access a data source using any of the available views, information can be seamlessly transferred between programs, thereby significantly reducing inter-program communication difficulties.

Within this program framework, a program may be defined as a collection of menu items, views, program modules and protocols related to the data sources. The menu items, views, program modules, protocols and data sources are all resources that are provided in the program framework. Associated with each of the resources is a name which provides a logical interface to the resource. In one embodiment, the name is a data structure and includes a pointer to an object associated with the resource and mapping information for associating the name with a handler that implements a protocol for retrieving the object. References to a resource are made using only the logical name. As a result, the implementation details involved with accessing the resource are transparent to the user. By separating interface from implementation, the program framework is capable of providing a common and consistent interface to both local and network resources.

According to a first aspect of the invention, a method of logically accessing a plurality of different resources using a common interface is provided. Each of the plurality of resources is physically accessed using a different protocol. The method includes the steps of, for each of the resources, providing a module associated with an implementation of the protocol associated with the resource providing a logical identifier associated with an interface to the resource, wherein the logical identifier is mapped to the module associated with the implementation of the protocol, and wherein references to the resource are made using only the logical identifier such that the implementation of the protocol associated with the resource is maintained separately from the interface.

According to another aspect of the invention, a method of generating a program for operation in a program framework includes the steps of A method of generating a program for operation in a program framework comprising the steps of identifying a data source to be accessed by the program, the data source represented by a model, generating at least one view of the model, wherein the view provides a logical interface for referencing the model and wherein the view is mapped to a handler for implementing a retrieval of the data source represented by the model, and mapping the view to the model.

According to another aspect of the invention, a program stored on a computer readable medium includes a hierarchically ordered plurality of namespaces, each namespace associated with at least one group of resources available to a program, each namespace comprising a plurality of names, each one of the plurality of names providing a logical interface to one of the resources in the at least one group, wherein each name is a data structure including a pointer to an object associated with the one of the resources in the at least one group and a mapping to a routine for implementing the retrieval of the associated object from an abstract storage system. According to a further aspect of the invention, a program framework includes a data storage system, a logical interface to the data storage system, a physical interface to the data storage system, wherein the logical interface is mapped to the logical interface, and a graphical user interface for providing access to the data storage system using only the logical interface.

BRIEF DESCRIPTION OF THE DRAWINGS

Reference will now be made to the attached figures, wherein like numbers refer to like elements in the different figures and wherein.

DETAILED DESCRIPTION

Figure 1:
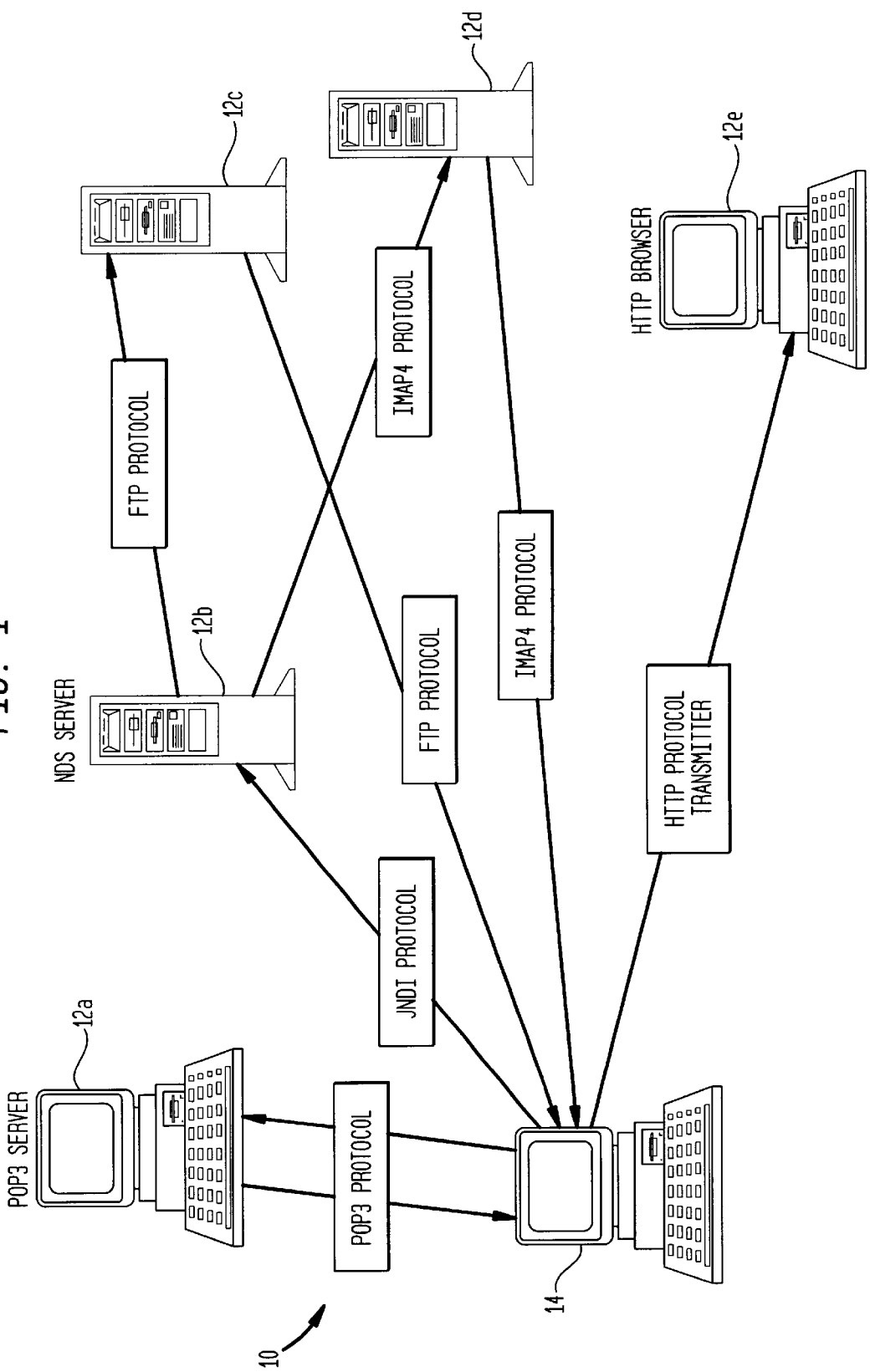
FIG. 1 is a block diagram of a network system in which the program framework of the present invention may be utilized.

Referring now to FIG. 1, a networked system 10 in which a program framework according to the invention is illustrated. As shown, networked system 10 includes a number of remote processing systems 12a–12e (generally and collectively referred to as remote processing systems 12) coupled to a user workstation 14. In the embodiment of FIG. 1, the workstation 14 includes the components for implementing the program framework of the present invention.

In the physical environment, to communicate with the remote processing systems 12, the workstation 14 must use the communication protocols associated with each of the systems. For example, the POP3 protocol is used to communicate with the POP3 server 12a, the FTP protocol is used to communicate with server 12c and the HTTP protocol is used to communicate with an HTTP browser executing on workstation 12e. However, the program framework of the invention enables a user to develop programs that reference the systems 12 (and other resources) using a common logical interface. For example, a user may access data located on the host workstation 14 or on the server 12c using the same logical interface. The implementation of the communication protocol associated with retrieving the data is transparent to the user. By separating the user interface to resources from implementation of the communication protocols or operating protocols of the resources, the program framework provides a straightforward method of controlling access to, manipulation of, addition or deletion of resources in any system in the network.

Although the above example illustrates a workstation in a conventional network, the program framework is not limited to executing on any particular type of device. For example, in addition to desktop computers and laptop computers, the program framework may be implemented on set-top boxes such as WebTV and Network Computers (NCs), handheld computing devices such as Windows CE devices and the Apple Newton 2000, LDC phones such as the Nokia 9000 Communicator and Motorola Smart Phone, one-way pagers, such as a Motorola alphanumeric pager and two-way pagers such as the Motorola Page Writer. In addition, the program framework may also be on a stand-alone system (one that is not coupled to a network) to provide a straightforward interface for multiple programs. Thus, the program framework is protocol independent and may be used in any device that is capable of accessing data and/or communicating with external devices.

In one embodiment, the program framework is implemented as an object oriented program, although any alternative programming method capable of storing and retrieving data may also be used and the present invention is not limited to object oriented programming. The method by which logical interfaces are mapped to implementations of communication or operative protocols in the program framework are described below with regard to object organization in the program framework. In addition, an exemplary program framework architecture that may be developed using the data structure organization of the program framework is also described below.

1. Object Organization in the Program Framework

Figure 2:
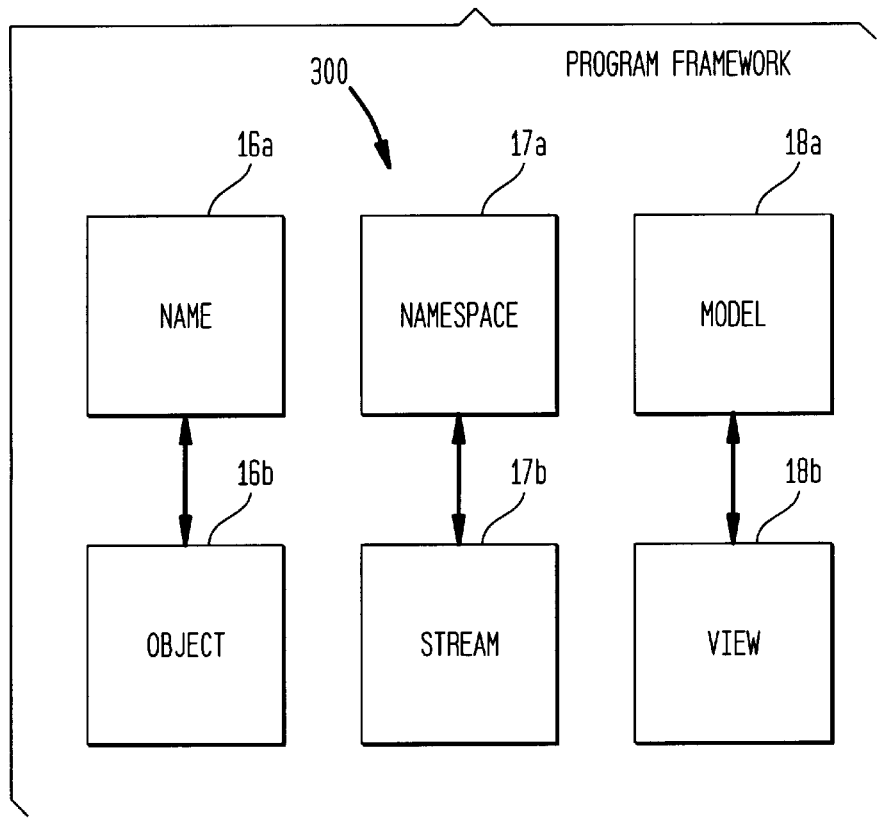
FIG. 2 is a block diagram illustrating exemplary class organizations for the objects within the program framework of one aspect of the invention.

In the program framework, every piece of data and every functional element is represented as an object. Associated with each object in the program framework is a name, and every resource accesses the object using the name in a uniform manner. Objects in the program framework are generally apportioned into three class categories: a name/object category, a namespace/stream category and a model/view category. FIG. 2 illustrates an object oriented implementation illustrating exemplary class organizations for objects within the program framework 300. In general, a name/object class uses a name 16a (logical interface) to reference a singular object 16b. The namespace/stream class uses a namespace 17a (logical interface) to reference a group of more than one object (stream 17b), and the model/view class is used for programming purposes, to provide a logical interface (view 18b) of a model (resource 18a). Each class category is described in further detail below.

A. Name/Object

1). Name

Every object in the program framework has a name and can be accessed by the associated name by any resource in a uniform manner. In the illustrative embodiment, a name includes a pointer to an object, and an object is referenced by its name.

Figure 3:
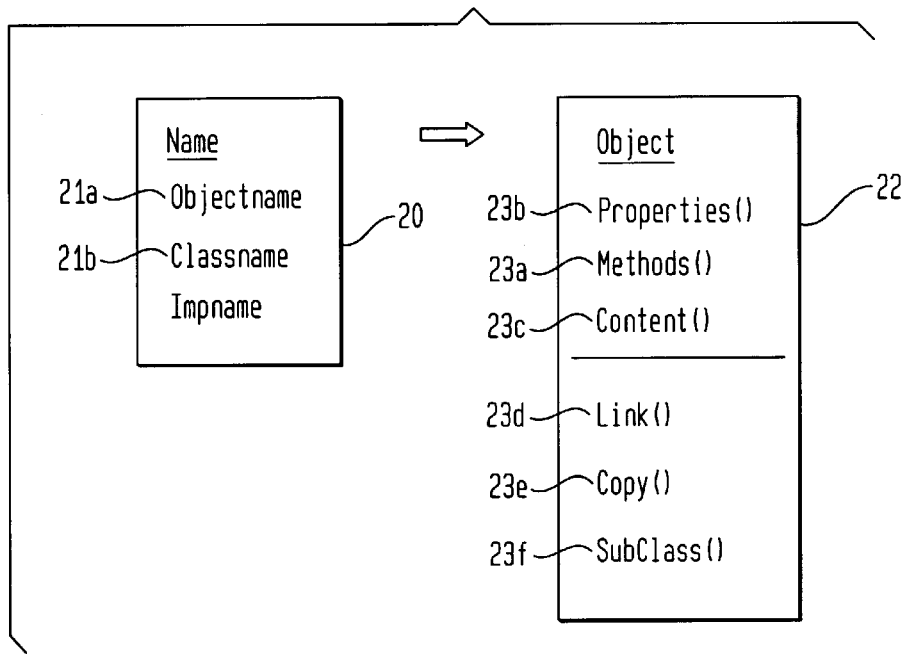
FIG. 3 illustrates exemplary data structures for objects in the name and object class of FIG. 2.

FIG. 3 illustrates one embodiment of a data structure for a name 20 that may be provided in class category 16a and a related data structure for an object 22 that may be provided in object class category 16b. As shown in FIG. 3, a name 20 includes two components. a class name 21b and an object name 21a. For example, for a file named "strategy.doc", ".doc" is the class name (and defines the interface for retrieving the object "strategy) and "strategy" the object name (which identifies the physical location of the object). The class name 21b is mapped to a handler (i.e., implementation routine) for retrieving the objects having a type associated class name. The accessing of an object 22 using the class name 21b is referred to herein as the implementation of the class name.

The implementation of the class names varies from simple to complex depending upon the object referenced. For example, when an integer class name object is accessed, the implementation of the class name integer may simply return the integer object. When a program class name object is accessed, the implementation of class name program may be responsible for loading class definitions and persistent objects and maintaining reference counts on objects.

As mentioned above, a user accesses the object 22 using only its name 20, the implementation of the class name 21b (i.e., the method used to access the object associated with the name) is transparent to the user. Thus, the use of names is one method by which the program interface enables separation of interface from implementation. Other methods, including namespace organization and the model/view relationship are described below.

2). Object a. Object Fields

As shown in FIG. 3, a data structure associated with an object 22 includes the following components: methods 23a, properties 23b, content 23c, Link 23d, Copy 23e and Sub-Class 23f. The content field 23c identifies the object, and therefore may identify any type of resource. In one embodiment, both methods 23a and properties 23b are namespaces (groups of one or more names), where each name in the namespace includes information (i.e., classname) for accessing the various methods and property objects associated with the object proper. The methods associated with an object identify the tasks performed by the object and are generally written as Java applets or other type of code. The properties of the object may include a reference count and storage information indicating the physical address at which the object is stored.

b. Object Commands

Any command available in object oriented programming may be performed on the object. It should be understood, however, that the present invention is not limited to the use of any particular commands. However, for purposes of explanation, the most frequently used command for the object 22 is the Dispatch command. The Dispatch() command causes the methods 23a of the object 22 to be executed.

3). Name/Object mapping

Figure 4:
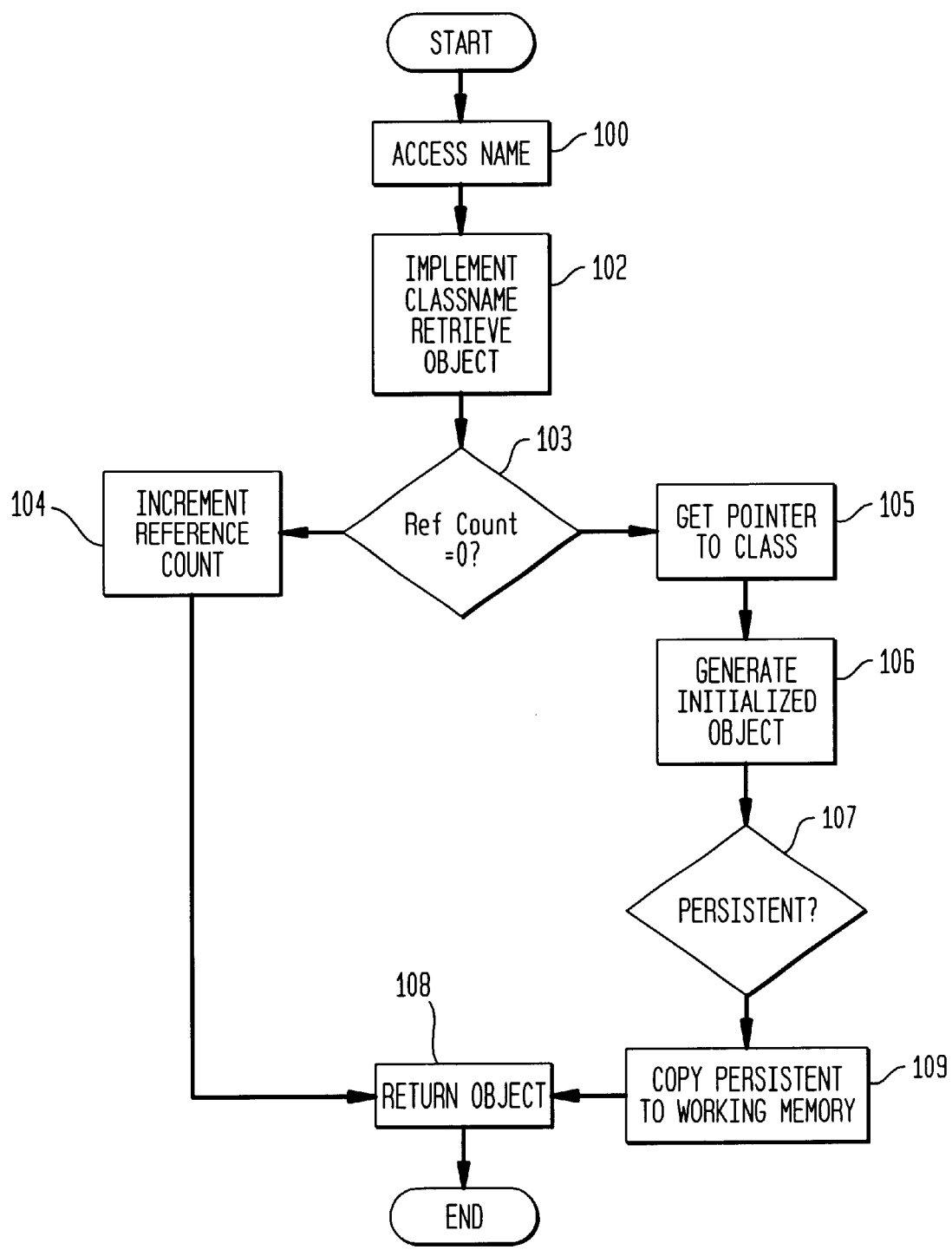
FIG. 4 is a flow diagram illustrating one embodiment of a method for mapping a name to an object in one aspect of the program framework of the present invention.

Referring now to FIG. 4, a flow diagram illustrating one embodiment of a method for mapping a name 20 to an object 22 is provided. In one embodiment of the invention, while a name may be loaded into working memory as soon as it is accessed, the object associated with the name may not be created or copied in working memory until the name is implemented.

At step 100, the name 20 is accessed. At step 102, the implementation of the class name 21b associated with the name 20 retrieves the object. At step 103 the reference count of the object is compared to zero, if it is greater than zero then the object has already been loaded in working memory and thus at step 104 the reference count is incremented. At step 10 the object is returned.

If at step 103 it is determined that the reference count is zero, the object has not yet been loaded into working memory. At step 105, the class name is used to obtain a pointer to the class of the object. At step 106, the class generates an initialized representation of the object within working memory. At step 107, it is determined whether the object is persistent or whether the object is a new object. If it is determined that the object is a new object, at step 108 the initialized representation is returned. If, at step 107, there is a copy of the object in persistent memory, at step 109 the object is copied from the persistent memory into the space allocated in working memory, and at step 108 the object is returned.

When an object is released, the above steps are reversed. The object's reference count is set to zero. If the object is a persistent object, the object is copied from working memory back to the persistent memory. Otherwise, the space allocated in the working memory to the object is released.

B. Namespaces/Streams

1). Namespaces

A namespace is a list of names associated with collections of objects, such as addresses, user lists and mailboxes. Thus, the namespace provides a logical context for referencing collections of objects. Namespaces may be used to classify information, where classification is a method of allocating information into categories. By using namespaces, a user works only with predetermined categories of information, rather than unrelated concepts of mail, folder, query, local file system, database, etc.

Because a namespace may be an object, the namespaces form the base of the hierarchy of objects in the program framework. For example, if a name in a namespace points to an object which is also a namespace, a hierarchy is generated. In the hierarchy, parent objects pass properties to their children, and children object inherit properties from their parents.

Figure 5:
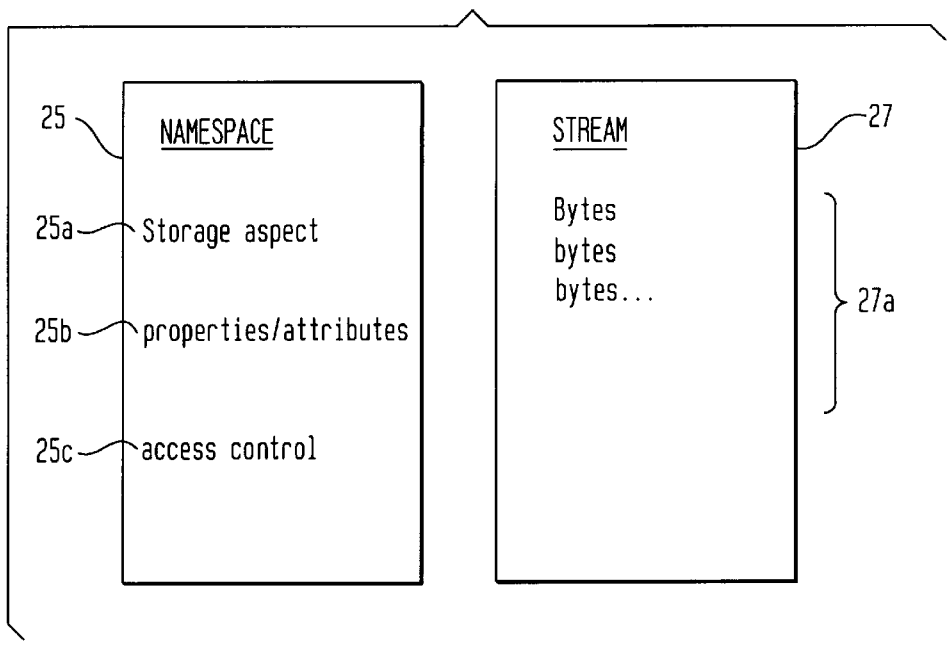
FIG. 5 illustrates exemplary data structures for objects in the namespace and stream class of FIG. 2.

One illustrative embodiment of a data structure of a namespace 25 and a data structure of a stream 27 is shown in FIG. 5. The namespace 25 includes a storage component 25a, a properties/attributes component 25b, and an access control component 25c. The storage component 25a identifies the storage type of the object you are working on, and therefore indicates whether the object is a file (i.e., a singular object having data associated therewith) or a folder (i.e., a namespace, including a list of files or other resources). The properties/attributes component 25b of the namespace identifies properties of the namespace, such as the size of the namespace, whether the namespace is linked to another namespace (i.e., parent child relationships), etc. The access control component 25c determines which users may have access to the resources of the associated namespace. In one illustrative embodiment, the storage component 25a, the properties/attributes component 25b and the access control component 25c are each implemented as namespaces.

A namespace is controlled using interface commands of insert(), remove() and iterate(), where the insert() and remove() commands control the addition and deletion, respectively of names from a namespace and the iterate() command is used to provide repetitive, sequential access to the namespace. As mentioned above, namespaces may be hierarchical. Any child namespace is free to extend its namespace (and, consequently its parent's namespace) using any protocol. Thus, any parent may support namespaces associated with a variety of resources, such as file systems, interfaces, Personal Data Warehouses (to be described later herein) and other objects. By using the namespaces, information may be organized by logical category, rather than by the protocols associated with obtaining the information. As a result, each namespace may include information obtained from resources using different protocols while the implementation details of the protocols are transparent to the user.

Example namespaces that may be provided in the program framework include MemoryNameSpace (including names of objects in memory), CacheNameSpace (including names of objects that are temporarily stored in a cache memory), SubNameSpace (including names of objects in a sub-class), ListNameSpace (including names of objects in a list), QueryNameSpace (including names of objects on which queries are performed), MethodNameSpace (including names of method objects) and FieldNameSpace (including names of field objects).

Like all objects, namespaces are dynamically generated at runtime, and the code to create them is dynamically loaded upon access. In one embodiment, when a particular namespace is accessed/created, only the names are retrieved/generated: no code or objects for any of the objects that the names refer to are loaded. Upon access of a particular name, the code to generate the object associated with the name is loaded and the object is generated as described above with regard to FIG. 4. Alternatively, the code to generate objects could be loaded when the namespace for the object is accessed, and the present invention is not limited to any particular timing of the generation of the objects.

Namespaces may be viewed in any number of ways. One method of viewing a namespace is through a folder, where the folder holds similar information. One type of folder provided in one embodiment of the invention is a smart folder. A smart folder is a namespace query over some protocol (for example, an internet search engine) that is executed at standard intervals and notifies a user when new data appears, similar to a mail program's notification of new mail. However, rather than merely monitor one source of data (like the mail program), the use of smart folders to view namespaces enables a user to monitor data from local and remote resources, without consideration to the various protocols of the different resources.

2). Streams

A stream is associated with a particular type of namespace. When a namespace identifies a file of information (a collection of one or more data objects), the associated stream identifies the physical locations of the storage of the bytes associated with the data objects. An illustrative example of a data structure of a stream 27 is provided in FIG. 5. The various functions that may be performed on the objects in the stream include read(), seek() and write().

C. Model/View

1). Model

Figure 6:
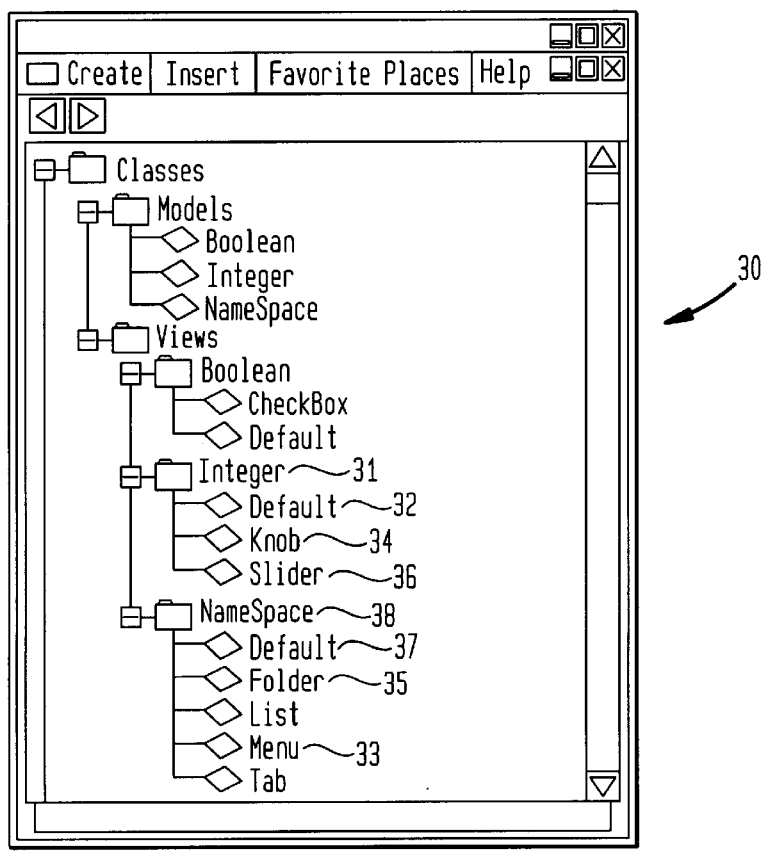
FIG. 6 is one embodiment of a graphical user interface illustrating the relationship between the model and view classes of FIG. 2 in accordance with one embodiment of the present invention.

A model is a logical representation of a concept. A view is a logical user interface that includes information for providing a sensory representation of the concept. Both a model and a view are objects. FIG. 6 illustrates one embodiment of a graphical user interface 30 for illustrating how a model/view relationship may be represented. In FIG. 6, models include Boolean, Integer and Namespace. One example of a Namespace model is a data storage resource, for example a MemoryNamespace listing the names of objects in a memory. Each model has one or more views, (methods of representing the concepts) associated with them. An integer view 31, for example, can be displayed as Default text, as indicated by view 32, a Knob, as indicated by view 34 or as a Slider as indicated by view 36. A NameSpace view 38 can be displayed as a menu view 33, folder view 35 or a default hierarchy 37.

As shown in FIG. 6, models are mapped to views in order of the class hierarchy. This mapping may be performed either dynamically or by an interface designer. To perform dynamic mapping, the class hierarchy of the model is traversed in order from child to parent, searching for the first super class (or parent) that has an associated view. For a user (or designer) defined mapping, this traversal defines only the possible views, and an interface designer or user may select among these. The mapping of the model to the view, once performed, is persistent; i.e., the mapping will remain until changed, and any children will inherit the view mapping.

2). View

As mentioned above, views are used to provide a sensory representation of their associated model. Thus, a view is a user interface object that uses a model as its implementation. Models/views are arranged in a hierarchy, with the desktop graphical user interface as the root view. Through object inheritance, views inherit or may override characteristics of their parents. Example views include menus, toolbars and the main graphical user interface (GUI) window.

A program is a combination of a view and a model. A programmer provides a new model such as an internet mailbox and then provides a new view of the model, such as a folder view. How a program is generated using the model/view paradigm is described in more detail below.

As mentioned above, a view provides a sensory representation of the model. In one embodiment, views may have an associated theme which dictates the visual display associated with the view. The themes are developed using a combination of visuals (such as defining backgrounds, frames and cursors) and view inheritance. Other graphic design techniques not described in detail below but known to those of skill in the art may also be used, and therefore the invention is not limited to the use of the below described tools.

3). Model/View and Interface/Implementation

A view is a user interface object that uses a model as its implementation. A view is also a model of sensory data; for example, a NameSpace view is itself a namespace, and mirrors the internal structure of the model for which it is the view.

Figure 7:
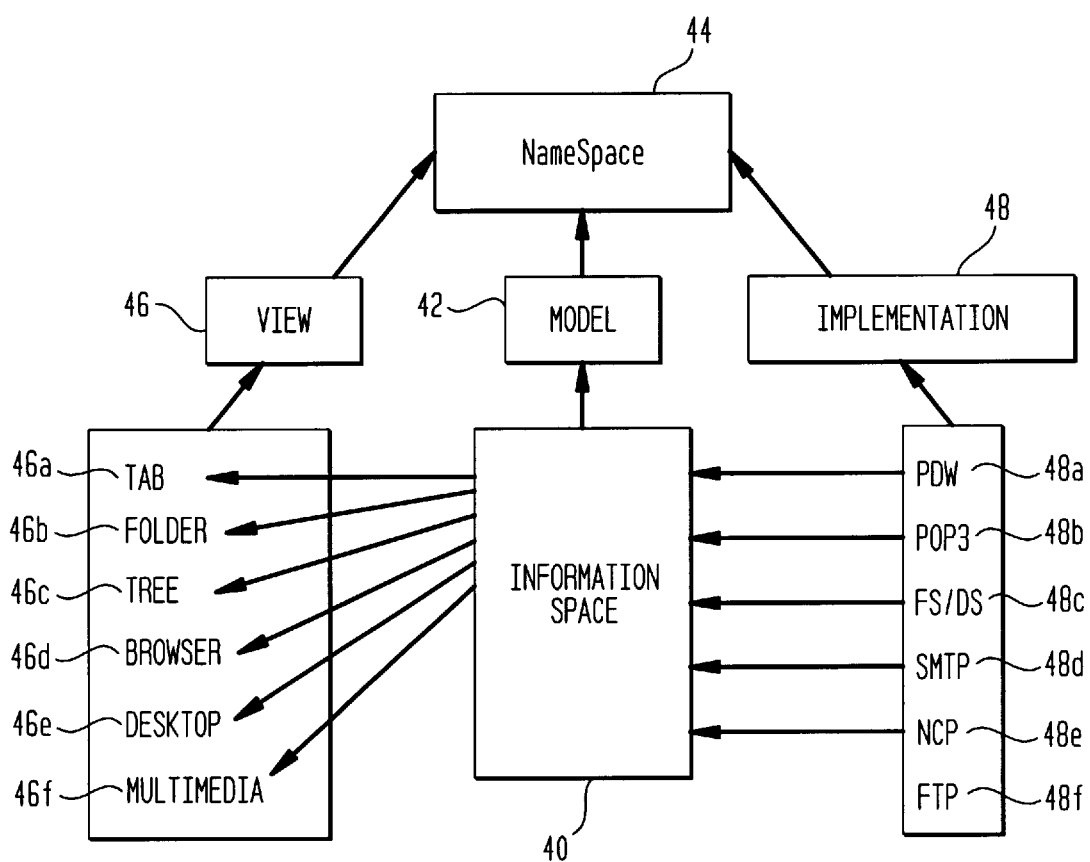
FIG. 7 is a block diagram for illustrating an exemplary implementation of the interface between model and view classes of the program framework of the invention.

The relationship between the view, model and implementation is provided in FIG. 7. A model 42 conceptually represents an information space 40. The model is identified by an allocated namespace name within NameSpace 44. Various groups of views 46 may also be allocated a namespace name from NameSpace 44. Each view 46a–46f provides a particular interface for viewing the contents of the information space 40.

The information space 40 represents an abstract memory space, and may include any resources located on either or both of the local and remote systems, wherein menu items, views, program modules, protocols and data sources are all resources within the program framework. Thus, the information space 40 is abstract because it represents any collection of resources regardless of the physical location of the resource.

The particular implementations 48 are represented through objects that are reference by names in the NameSpace 44. The implementations 48a–48f, illustrated in FIG. 7 are protocol implementations which enable the program framework to interface with other devices on the network to access data at the resources that is part of the information space 40. However, the implementations may be any type of task that is performed on the information space 40, and is not limited to interface protocols.

2. Program Framework Architecture

The program framework architecture is built using the class, namespace and object organizations described above. Thus, the program framework architecture is basically a hierarchy of namespaces, each of which control the operation of different components in the designed programming system.

The program framework architecture includes an abstract storage system which is distributed across all of the interconnected devices in a coupled network. The storage system is said to be abstract because it includes data located at any source in the network, however, the storage appears to a user to be locally available through the user interface. For example, the abstract storage system may be referred to as MemoryNamespace, and include any data sources that are stored in any file system in the local or remote systems.

Figure 8:
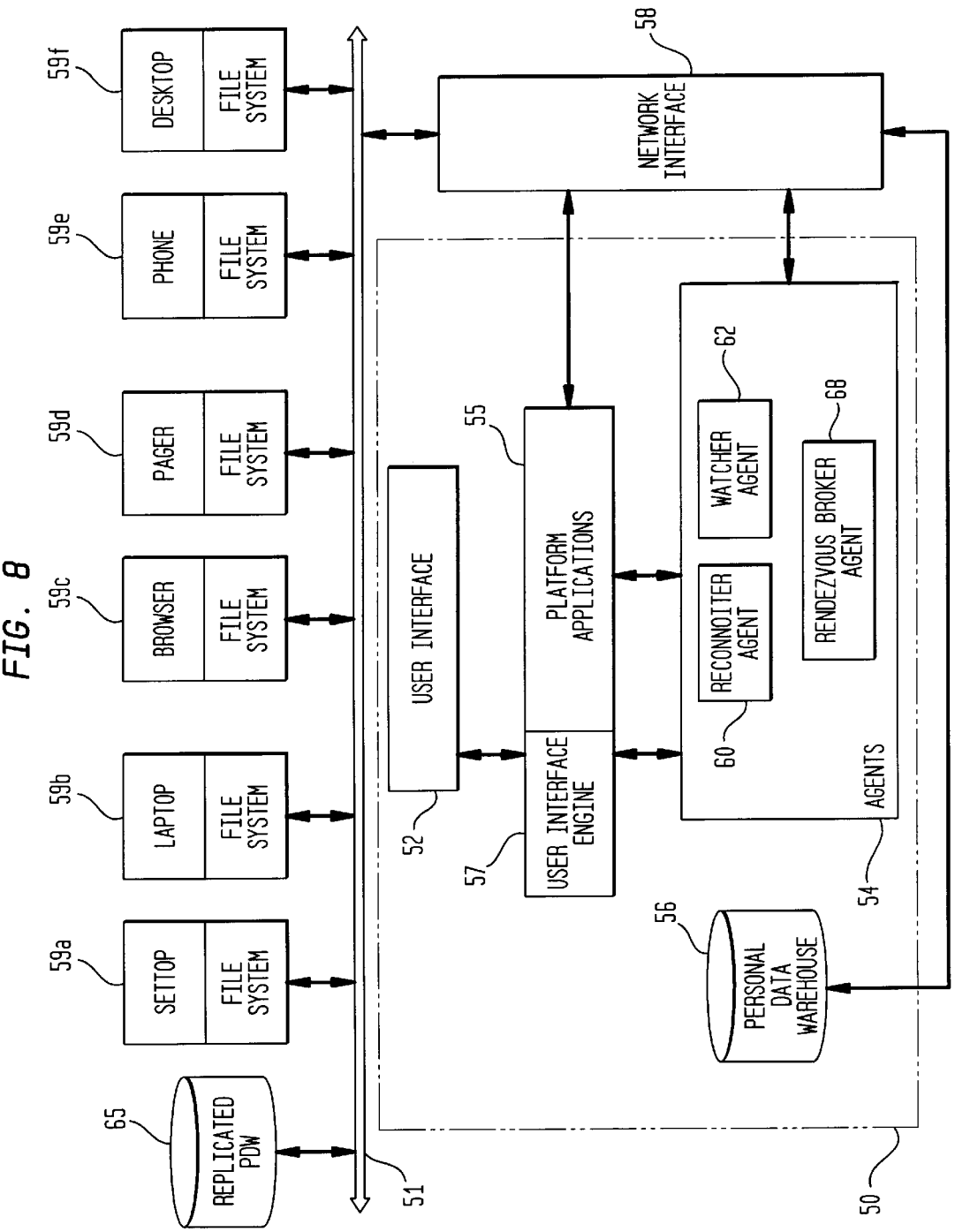
FIG. 8 is a block diagram illustrating components that may be provided in an exemplary program framework architecture designed using the program framework concepts of the invention.

A block diagram of an illustrative embodiment of a program framework architecture that may be developed using the program framework described above is provided in FIG. 8. The program framework architecture 50 is shown to include a number of code modules, data, menu items and views that are stored in a storage system of processing system. The particular code modules, menu items and views described below are merely exemplary implementations of the program framework, and the present invention is not limited to the development of a program framework which includes these modules.

The code modules, data, menu items and views are each shareable by any of the components in the framework. In one embodiment, the program framework includes a user interface component 52, an agent component 54, a platform application component 55 (including user interface engine 57) and a personal data warehouse 56. Coupled to the program framework architecture may be a network interface 58, which provides a communication pathway between the program framework 50 and one or more coupled network devices such as devices 59a–59f over network interconnect 51. Each of the components of the program framework architecture 50 is described in more detail below.

A. User interface component/User Interface Engine

Figure 9:
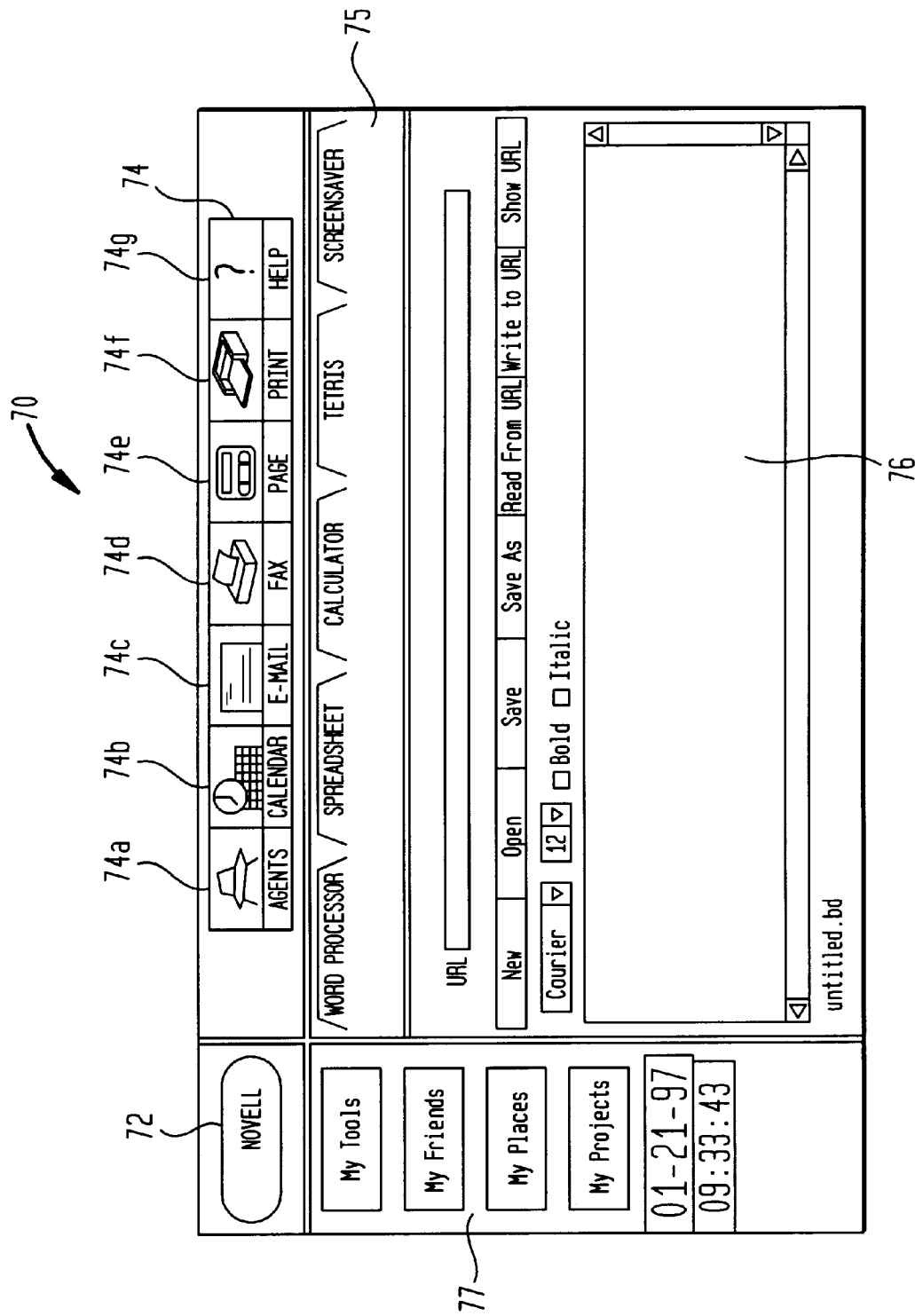
FIG. 9 illustrates one embodiment of a graphical user interface that may be developed using the program framework of the invention for controlling a program framework architecture such as that shown in FIG. 8.

The user interface engine 57 controls the transfer of data between the agents 54, the personal data warehouse 56, the server 58 and the user interface 52. One embodiment of a generic user interface 70 that may be used in the program framework is illustrated in FIG. 9. The generic user interface includes six different architecture components, five of which are represented in FIG. 9. The six architecture components include a name recognition component 72, a tool belt component 74, a navigation component 75, a content component 76, a context component 77 and a notification component. All of the components are objects, each of which has an associated view that is either dynamically provided or designed by the user.

The user interface component of the program framework may be customized by the user provide any type of themed user interface. The basic operation of the components is described in more detail below.

1). Name recognition - The name recognition component 72 may be used to provide a visual identifier of the developer of the program framework. Alternatively, the area of the GUI allocated to name recognition could be used to set and display preferences for the components of the program framework, to provide a link to a web-site or show progress of an executing event. It is not a requirement of the invention that the name recognition component be provided in a user interface.

2). Tool belt - The tool belt component 74 is used to graphically illustrate tools and services that are available to the user. For example, in the generic UI of FIG. 9, the tool belt is shown to include an agent access button 74a, a calendar button 74b, an email button 74c, etc. The tool belt component is designed by the user, and therefore there are no required tools or Services for the tool belt.

3). Context and Navigation - The context component 77 works in conjunction with the Navigation component 75. The context component visually displays one or more available operative contexts of the user interface. In the example of FIG. 9, the available operative contexts include a my tools context, my friends context, my places context and my projects context. When one of the contexts is selected, available resources within that context are displayed in the navigation component 75 (wherein menu items, views, program modules, protocols and data sources are all resources that are available in the program framework). In the example of FIG. 9, the "my tools" context has been selected, and the available tools have been displayed as tabbed folders by the navigation component 75. Selecting one of the displayed tabbed elements in the navigation component results in the operation of the associated element (or the associated element itself being displayed in the content window.

4). Content - The content component 76 provides a graphical display of the current task being performed in the program framework. For example, the content component may display word processor windows, e-mail interfaces, etc.

5). Notification - Notification may be used to for a variety of purposes in the program framework. For example, notification may be used to manage objects by alerting one object about the state of change of any other object, or notifying a pointer or URL when an object it points to has been moved. Notification may be used to manage the user interface by notifying a display window when their data has been changed so that the windows may be updated. Notification may also be used to alert the user about the occurrence of an event. For example, a user can be notified when new mail arrives. The notification may be in the form of a visual or audio alert to the user that an event has occurred, such highlighting a tool in the tool belt to indicate a changed status of the tool. Or notification may simply be provided as text messages in the content component. Other methods of notification may also be provided, and the present invention is not limited to any particular type of notification.

Of all of the user interface components, notification is the only user interface component that should be provided in a system developed using the program framework, because it allows many types of devices, some of which are only capable of providing notification, to be available data resources for the program framework. For example, the provision of the notification component permits devices such as a numeric pager, which is capable of notifying a user by audio tone or vibration to the program framework architecture.

In addition to the six components, user interface tools such as menus, secondary windows, browser bars, drag and drop capabilities and other known user interface components may additionally be used within the program framework.

B. Agent component

Referring back to FIG. 8, a grouping of code modules that are provided in the exemplary program framework architecture is agent component 54. The agent component 54 includes one or more agents, such as agent 60, 62 and 68, where an agent is an object having methods that perform user defined tasks, The tasks may range from simple tasks to more analytical tasks, including those using artificial intelligence techniques. The agents may be implemented as Java applets, C code or any other type of code, and the present invention is not limited to any particular type of coding for the agent. It should be noted that the agents described above are merely exemplary agents that may be developed using the concepts described above with regard to the program framework and the present invention is not limited to the provision of any particular type of agent.

In one embodiment of the invention, the particular agents that are provided are selected in order to maximize the use of existing mechanisms while minimizing the complexity of operations performed by the agents. The various agents include reconnoiter agent 60, watcher agent 62 and rendezvous broker agent 68. Alternative agents may be added as deemed necessary by the system designer, and the present invention is not limited to merely the disclosed agents. The general functions performed by each of the agents is described in more detail below.

1). Reconnoiter agent - The reconnoiter agent 60 ensures referential integrity by identifying objects that have moved and updating the storage information with regard to these objects. The reconnoiter agent may be designed to watch for any movement of objects in the system, or alternatively may be designed to only check whether an object has moved after it has been accessed.

2). Watcher agent - The watcher agent 62 monitors a users usage patterns, and uses the knowledge gained from the monitoring intelligently to suggest adaptive improvements to the user. To perform this monitoring step, the watcher agent collects usage data, matches usage data to known usage patterns (tasks) and acts on the data.

3). Rendezvous Broker Agent- The rendezvous broker agent brokers collaboration between users based upon the resources available to each user. The identification of users may be made using a participants list or a group roster. The rendezvous broker agent monitors the location and activity of each of the users to determine when and how the users may best share information.

B. Application platform component

The platform application component 55 comprises the programs and services which are locally available to the program framework. These platform applications may include, for example, a word processor, a directory service application, e-mail, etc. Each of the platform applications are developed using the namespace, class and object organizational structure described above.

C. Personal Data Warehouse (PDW)

The personal data warehouse 56 is provided for storing configuration data for the developed program framework architecture. Thus, the personal data warehouse stores the entire hierarchy of the program framework architecture, from user interface to data source, By storing the configuration of the program framework architecture, consistent mechanisms for accessing resources is maintained.

In one embodiment, the contents of the personal data warehouse are replicated and stored at a repository on the network. The replicated PDW is shown as element 65 in FIG. 8 as a separate element coupled to network interconnect 51, although in fact it may stored on any device in the network or distributed across network device. The replicated PDW allows a user to connect to the network using any system but still gain access to their customized framework.

3. Designing a program framework architecture

In one embodiment, each of the program code modules that may be designed using the concepts of the program framework described above may be apportioned into three levels, a generic framework, a domain specific framework and an abstract framework. The generic framework provides services includes those modules that are used by most applications, such as persistence, notification and security. The domain specific framework is an extension to the generic framework and includes those modules targeted at particular domains such as an address book or calendar. The abstract framework is a collection of design patterns or modules.

The framework is strictly modularized: any module may be used in any of the frameworks (e.g., generic, domain specific and abstract), any module may be used by other program frameworks and modules can be replaced or extended, essentially extending the framework itself. This modularity allows the maximum flexibility in both program integration and productization.

Figure 10:
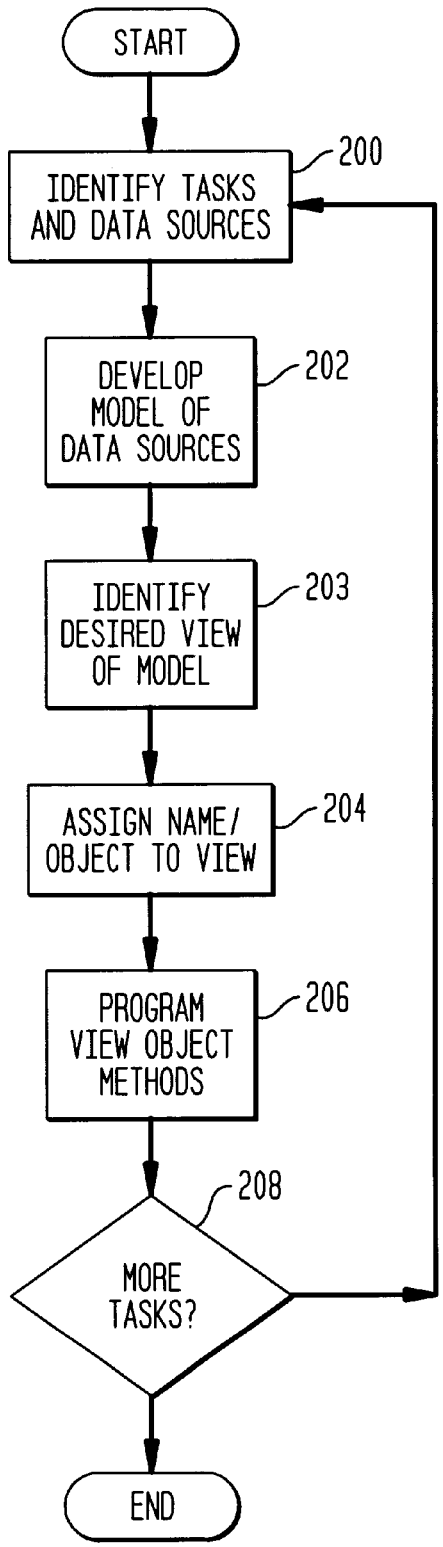
FIG. 10 is a flow diagram illustrating one method of designing a program framework architecture using the program framework class organization of FIG. 2.

Referring now to FIG. 10, a flow diagram outlining discrete steps in developing the program framework architecture is provide& At step 200, the first step in establishing a framework is to identify a task that is to be performed and the data sources that are to be accessed by the task, Once the data source have been identified, at step 202 a model of the data sources may be developed. The model is developed by assigning names to each of the data sources, and allocating objects to each of the names as described in the flow chart of FIG. 4. At step 203, a desired view of the model is identified.

Next, at step 204 a name/object pair is assigned to the view. At step 206 the particular interface of the view is programmed by the user and stored as one or more methods with the object. If one or more of the tasks associated with the view have already been programmed as objects, a link to the existing object is provided, rather replicating functional objects. Once the desired view has been programmed, the process returns to step 200, where more tasks may be developed by the user.

The method shown in FIG. 10 illustrates the basic flow involved in adding program modules in the program framework. Depending upon the complexity of the program developed, the hierarchy and inter-relationships of namespaces and views may become quite complex. However, the basic concepts of separating the interface to the model from the implementation of the model facilitates the design of the program framework by providing a logical framework for program development.

Figure 11:
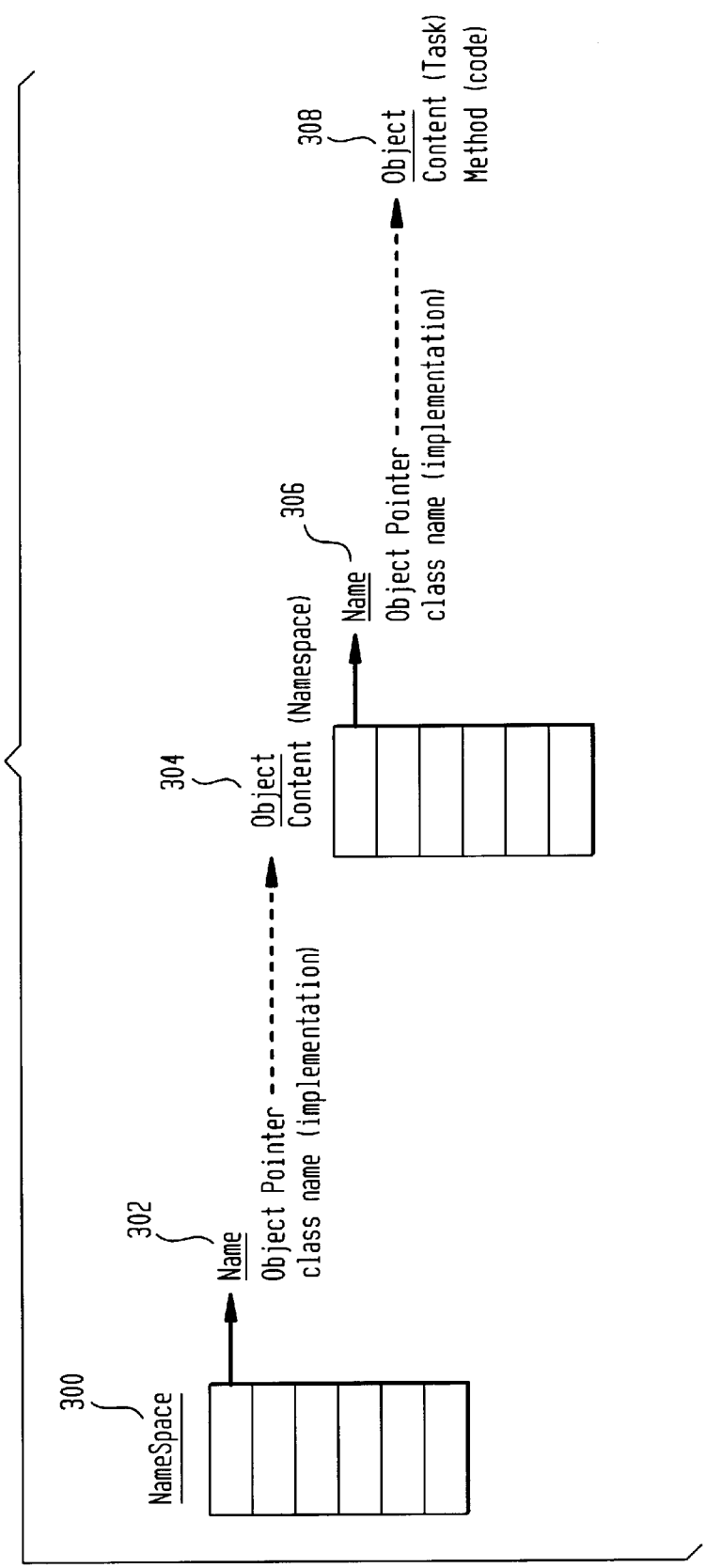
FIG. 11 illustrates a data structure hierarchy which may be included in a program framework designed using the steps of FIG. 10.

Referring now to FIG. 11, an exemplary program framework hierarchy is shown that may be provided using the method of program development described in FIG. 9. In FIG. 11, a namespace 300 is first generated. The namespace includes one or more names such as name 302. The data structure of the name includes a pointer to an object associated with the name and a class name which is mapped to a handler for implementing the retrieval of the object from its storage location.

The object 304 may itself be a namespace. As a namespace, it includes one or more names such as name 306, which similarly includes a pointer to an object and a class name. In the example of FIG. 11, the object 308 pointed to by the name 306 may be a code module, or task, which includes one or more methods for executing the tasks.

One example of a resource that may be represented by the hierarchy of FIG. 11 is a list of views. Namespace 300 may include a list of all views available for a toolbar, for example. The namespace 304 may include a list of all views available in a menu associated with one button of the toolbar, while object 308 may include code for representing the view associated with a particular menu item on the toolbar.

One example of an application whose operation may be enhanced by programming using the program framework is a directory services application, where a directory service application is a system for accessing hierarchically stored data according to different properties, attributes and/or characteristics of the data. A directory service application operating under the program framework is capable of seamlessly transferring data to and from various resources using a common logical user interface. This allows data to be temporarily cached at remote storage locations. In addition, modifications to the data, made by remote systems, may be easily retrieved by the directory service application. As a result, the directory services application may be run on a low-cost machine, yet utilize the resources of other machines in an interconnected network.

Thus, a hierarchical program framework has been described having a data organization that separates logical interfaces from physical implementations. By providing logical interfaces, users may easily transfer data between resources without regard to protocols associated with the resources. Rather, all resources are available for any operation by all users. Programs are developed as views on an abstract data system. As a result, in order to add program functionality to a system, one need only add a new view to the existing data. The use of logical interfaces permits program functionality to be modularized, thereby facilitating sharing of code modules between views and reducing storage overhead.

Having described various embodiments of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

What is claimed is:

1. A method of transparently transferring data between a plurality of different resources, wherein each of the plurality of resources is physically accessed using a different protocol, the method comprising the steps of:

for each of the resources, providing a module associated with an implementation of the protocol associated with the resource; and for each of the resources, providing a logical identifier associated with a user interface to the resource, wherein the logical identifier is mapped to the module associated with the implementation of the protocol, and wherein a user can indicate that one of the resources should be accessed using only a respective one of the logical identifiers such that the implementation of the protocol associated with the resource is maintained separately from the user interface.

2. The method according to claim 1, further comprising:

providing a data structure each of the plurality of resources;

providing a name for each of the plurality of the resources, each name providing the logical interface to the resource and including a pointer to the data structure associated with the resource and a mapping to a protocol for implementing the retrieval of the data structure; and referencing each resource by invoking the name associated with the resource, wherein the invoking of the name results in an implementation of the protocol for accessing data at the each resource.

3. The method according to claim 2, wherein a plurality of names associated with a plurality of references are grouped into a namespace, wherein the namespace is a data structure referenced by a namespace name, and wherein a step of invoking the namespace name results in an iterative retrieval of names in the namespace.

4. The method according to claim 3, wherein, for each retrieval of a name from the namespace, the data structure indicated by the pointer associated with the name is retrieved from the abstract storage system.

5. The method according to claim 1, wherein the resources include menu items, views, program code, protocols and data sources.

6. The method according to claim 1, wherein a combination of the plurality of resources provides an abstract storage system, and wherein references to each of the plurality of resources are made by referencing the abstract storage system.

7. A method of generating a program for operation in a program framework comprising the steps of:

identifying a data source to be accessed by the program, the data source conceptually represented by a model;

generating at least one view of the model, wherein the view provides a logical interface for referencing the model, is mapped to a handler for implementing a retrieval of the data source represented by the model and provides an interface for viewing the data source; and mapping the view to the model, wherein the view and the model are combined to generate the program.

8. The method according to claim 7, further comprising the step of adding functionality to the program by modifying the view of model, wherein the modified view includes at least one method incorporating the added functionality of the program.

9. The method according to claim 7, further comprising the step of integrating a new program into the program framework by generating a new view of the model, wherein the new view of the model includes at least one method associated with the a new task to be performed by the new program.

10. Program stored on a computer readable medium, the program comprising:

a hierarchically ordered plurality of namespaces, each space associated with at least one group of resources available to a program, each namespace comprising a plurality of names, each one of the plurality of names providing a logical interface to one of the resources in the at least one group, wherein each name is a data structure including a pointer to an object associated with the one of the resources in the at least one group and a mapping to a routine for implementing the retrieval of the associated object from an abstract storage system, and wherein each namespace may comprise names mapped to different routines for implementing object retrieval such that the routines are transparent to a user.

11. A program framework comprising:

a data storage system;

a logical interface to the data storage system;

a physical interface to the data storage system, wherein the logical interface is mapped to the physical interface; and a graphical user interface for providing access to the data storage system using only the logical interface, wherein the physical interface is transparent to a user and a common and consistent interface to the data storage system is provided to a user.

12. The program framework according to claim 11, wherein the program framework is implemented on a system, and wherein the data storage system is an abstract hierarchical storage system comprising code modules and data from one or more resources associated with the system.

13. The program framework according to claim 12, wherein the system is coupled to a network including at least one device, and wherein the data storage system comprises code modules and data from one or more sources associated with the system and from the at least one device.

14. The program framework according to claim 12, further comprising a replicated version of the data storage system, the replicated version of the data storage system being stored on the network.

15. The program framework according to claim 11, wherein the logical interface to the data storage system includes at least one namespace, the namespace comprising a plurality of names, each one of the plurality of names including a pointer to a different object, with each of the different objects are associated with a resource in the data storage system and including at least one method for implementing the physical interface to the resource.

16. The program framework according to claim 11, wherein the logical interface comprises a name of an object in the data storage system, and wherein the graphical user interface provides at least one view of the object, with the at least one view including a task to be performed on the object.

17. The program framework according to claim 11, wherein the graphical user interface includes a notification component.

18. The program framework according to claim 11, wherein the graphical user interface includes a context component.

19. The program framework according to claim 18, wherein the graphical user interface includes a navigation component for displaying available resources in response to a state of the context component.

20. A program framework comprising:

at least one data storage system;

for each of the at least one data storage systems, an implementation of at least one of an access protocol and a task for the data storage system;

for each of the at least one data storage systems, a logical interface to the data storage system, wherein the logical interface is mapped to the implementation but is otherwise separated from the data storage system; and a graphical user interface associated with the logical interface for each data storage systems and otherwise separated from the implementation for each of the at least one data storage systems, wherein the graphical user interface provides the user with common and consistent access to each of the at least one data storage systems.

* * * * *

UNITED STATES PATENT AND TRADEMARK OFFICE
CERTIFICATE OF CORRECTION

PATENT NO. : 6,446,253 B1
DATED : September 3, 2002
INVENTOR(S) : Joseph Andrew Mellmer It is certified that error appears in the above-identified patent and that said Letters Patent is hereby corrected as shown below:

Column 5,
Line 12, change "components." to -- components: --.

Column 6,
Line 12, change "10" to -- 108 --.

Column 10,
Line 22, change "Services" to -- services --.
Line 39, change "itself" to -- itself) --.

Column 11,
Line 16, after "defined", change "tasks," to -- tasks. --.
Line 24, change "framework" to -- framework, --.

Column 12,
Line 6, change "source," to -- source. --.
Line 39, change "provide&" to -- provided. --.
Line 41, change "task," to -- task. --.

Column 14,
Line 9, after "structure" insert -- for --.
Line 19, after "at" delete "the".
Line 52, after "of" insert -- the --.
Line 59, after "with" delete "the".
Line 61, change "Program" to -- A program --.
Line 64, change "space" to -- namespace --.

UNITED STATES PATENT AND TRADEMARK OFFICE
CERTIFICATE OF CORRECTION

PATENT NO.   : 6,446,253 B1
DATED        : September 3, 2002
INVENTOR(S)  : Joseph Andrew Mellmer It is certified that error appears in the above-identified patent and that said Letters Patent is hereby corrected as shown below:

Column 16,
Line 2, after "objects" delete "are".
Line 31, change "systems" to -- system, --.

Signed and Sealed this

Eleventh Day of February, 2003

JAMES E. ROGAN
*Director of the United States Patent and Trademark Office*